(12) United States Patent
Tamura

(10) Patent No.: US 7,709,597 B2
(45) Date of Patent: May 4, 2010

(54) POLYMER MADE FROM ORGANOSILANE COMPOUND AND BORON COMPOUND

(75) Inventor: Shinichi Tamura, Fukushima (JP)

(73) Assignee: Nitto Boseki Co., Ltd., Fukushima-Shi (JP)

( * ) Notice: Subject to any disclaimer, the term of this patent is extended or adjusted under 35 U.S.C. 154(b) by 36 days.

(21) Appl. No.: 11/920,518

(22) PCT Filed: May 31, 2006

(86) PCT No.: PCT/JP2006/310859

§ 371 (c)(1),
(2), (4) Date: Nov. 16, 2007

(87) PCT Pub. No.: WO2006/129695

PCT Pub. Date: Dec. 7, 2006

(65) Prior Publication Data

US 2009/0082501 A1 Mar. 26, 2009

(30) Foreign Application Priority Data

May 31, 2005 (JP) ............................. 2005-159037

(51) Int. Cl.
C08G 79/08 (2006.01)
B32B 27/00 (2006.01)
(52) U.S. Cl. ........................ 528/394; 528/8; 428/447
(58) Field of Classification Search .................... 528/5, 528/7
See application file for complete search history.

(56) References Cited

U.S. PATENT DOCUMENTS

| | | | | |
|---|---|---|---|---|
| 2,972,598 | A * | 2/1961 | Morehouse | 528/26 |
| 3,121,692 | A * | 2/1964 | Morehouse et al. | 252/75 |
| 3,832,204 | A * | 8/1974 | Boaz | 106/287.11 |
| 4,095,010 | A * | 6/1978 | Zellar et al. | 428/375 |
| 4,172,042 | A * | 10/1979 | Kiisler et al. | 252/62 |
| 4,176,105 | A * | 11/1979 | Miedaner | 524/598 |
| 4,410,669 | A * | 10/1983 | Panster et al. | 525/474 |
| 5,328,645 | A * | 7/1994 | Lin et al. | 516/111 |
| 5,360,834 | A | 11/1994 | Popall et al. | |
| 6,432,191 | B2 * | 8/2002 | Schutt | 106/287.13 |
| 6,451,382 | B2 * | 9/2002 | Schutt et al. | 427/387 |
| 6,838,486 | B2 * | 1/2005 | Ryang | 516/90 |
| 6,955,771 | B2 * | 10/2005 | Ryang | 252/389.31 |
| 7,253,226 | B1 * | 8/2007 | Ryang | 524/492 |
| 7,419,538 | B2 * | 9/2008 | Li et al. | 106/403 |
| 2001/0056141 | A1 * | 12/2001 | Schutt | 524/261 |
| 2005/0279140 | A1 * | 12/2005 | Adzima et al. | 65/453 |
| 2006/0121300 | A1 * | 6/2006 | Matsumura | 428/541 |
| 2006/0189736 | A1 | 8/2006 | Mori et al. | |
| 2006/0204763 | A1 * | 9/2006 | Hartman et al. | 428/417 |

FOREIGN PATENT DOCUMENTS

| | | |
|---|---|---|
| DE | 39 25 462 A1 | 2/1991 |
| JP | 7-11001 | 1/1995 |
| JP | 7-82380 | 3/1995 |
| JP | 10-120790 | 5/1998 |
| JP | 2000-319512 | 11/2000 |
| JP | 2002-128898 | 5/2002 |
| JP | 2002-241744 | 8/2002 |
| JP | 2005-200625 | 7/2005 |
| WO | WO 01/64804 A1 | 9/2001 |

OTHER PUBLICATIONS

*Glass Engineering Handbook*; published by Asakura Shoten in Japan; 1st edition; Jul. 5, 1999; pp. 47-49 and cover sheet (4 Sheets total).
*Glass Engineering Handbook*; published by Asakura Shoten in Japan; 1st edition; Jul. 5, 1999; pp. 432-438 and cover sheet (8 Sheets total).

* cited by examiner

*Primary Examiner*—Randy Gulakowski
*Assistant Examiner*—Robert Loewe
(74) *Attorney, Agent, or Firm*—Kratz, Quintos & Hanson, LLP

(57) ABSTRACT

A novel polymer comprising a reaction product obtained by reacting an organosilane compound with a boron compound. The polymer comprises a reaction product obtained by reacting (a) an aminated silane compound represented by the formula $R_{4-n}$—Si—$(OR')_n$ (wherein R represents an aminated organic group; R' represents methyl, ethyl, or propyl; and n is an integer of 1-3) with (b) at least one boron compound selected from the group consisting of $H_3BO_3$ and $B_2O_3$, the amount of the ingredient (b) being 0.02 mol or larger per mol of the ingredient (a).

12 Claims, No Drawings

POLYMER MADE FROM ORGANOSILANE COMPOUND AND BORON COMPOUND

TECHNICAL FIELD

The present invention relates to a polymer and a polymer composition comprising a reaction product obtained by reacting an organosilane compound with a boron compound, and a glass base material and functional material using such a polymer or polymer composition.

BACKGROUND ART

The conventional silicic materials comprising an organosilane compound and a boron compound were either polymerized ones which have undergone a hydrolytic reaction of said both compounds in an aqueous phase or unpolymerized ones without both compounds being allowed to react with each other. This hydrolytic reaction is usually carried out by a sol-gel method, but it has disadvantages in that it requires a complicate process and necessitates a long time for the production.

For instance, Non-Patent Document 1 describes a process for producing glass by a sol-gel method by using silicon ethoxide ($Si(OC_2H_5)_4$) as one of the metal alkoxides and trimethoxyboron ($B(OCH_3)_3$) as another metal alkoxide which is an additional reactant, dissolving them in an alcohol solvent and water and carrying out the reaction while controlling pH of the solution and the catalyst used. According to this method, the metal alkoxides are hydrolyzed and polycondensed to form a sol and then it is turned into a gel while controlling the reaction conditions, followed by drying and sintering to produce glass.

Non-Patent Document 2 discloses a method in which silicon ethoxide ($Si(OC_2H_5)_4$), used as one of the metal alkoxides, is reacted with water and hydrolyzed to form a sol and then it is brought into a gel state while controlling the amount of water, type of the catalyst, pH and other process conditions to produce an organic-inorganic complex.

Also, Patent Document 1 discloses a curable resin composition with a high curing rate, which comprises (A) a curable resin having a hydrolysable silyl group, (B) a Lewis acid such as boron trifluoride or its amine complex, (C) an aminosilane compound having an amino group in the molecule, and (D) a mercaptosilane compound containing a hydrolysable silyl group and a mercapto group.

Patent Document 2 describes a cold curing composition comprising a material obtained by mixing and reacting an alkoxysilane having a glycidoxypropyl group and an alkoxysilane having an aminopropyl group. However, for obtaining a film-forming coating solution, it is necessary to contain a diluting solvent, a curing catalyst and an ultraviolet absorber in the said cold curing composition.

Patent Document 3 teaches a method for producing a boron-containing organosilazane polymer having a specific skeletal structure, obtained by mixing dichlorodiphenylsilane, used as an organohalogenosilane, and boron trichloride in a toluene solvent at a temperature of 0° C. or below to induce co-ammonolysis with ammonia gas.

Patent Document 1: JP-A-2005-54174

Patent Document 2: JP-A-2000-319512

Patent Document 3: JP-A-7-11001

Non-Patent Document 1: Glass Engineering Handbook, published by Asakura Shoten in Japan, 1st ed., pp. 47-49, Jul. 5, 1999.

Non-Patent Document 2: Glass Engineering Handbook, published by Asakura Shoten in Japan, 1st ed., pp. 432-438, 1999.

DISCLOSURE OF THE INVENTION

Problem to be Solved by the Invention

The present invention provides a novel polymer and polymer composition which can be produced without necessitating complicate steps such as hydrolysis, which is essential in a sol-gel method and without requiring a long time for the procedure, and provides a glass base material and functional material using such a polymer or polymer composition.

Means for Solving the Problem

The present invention solves the above problem and provides a polymer comprising a reaction product obtained by reacting (a) a silane compound containing an amino group represented by the following formula:

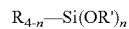

$$R_{4-n}\text{—}Si(OR')_n$$

(wherein R represents an organic group containing an amino group; R' represents methyl, ethyl or propyl; and n is an integer selected from 1 to 3) with (b) at least one boron compound selected from the group consisting of $H_3BO_3$ and $B_2O_3$, in an amount of the component (b) being 0.02 mol or larger per mol of the component (a).

The present invention also provides a polymer composition comprising the said polymer and a metal alkoxide, a silicone oil, a synthetic resin, an inorganic powder and/or a carbon powder.

The present invention further provides a functional material which is obtained by coating an inorganic or organic base materials with the said polymer or polymer composition. The present invention also provides a polymer composition which is fibrous or granular in shape.

The present invention further provides a glass base material obtained by calcining the said functional material or the said fibrous or granular polymer composition at a temperature of 1,000° C. or below.

ADVANTAGES OF THE INVENTION

The present invention can produce a novel polymer or polymer composition without requiring the complicate steps such as hydrolysis needed in a sol-gel method, and also without taking a long time for the production. The obtained polymer and polymer composition can be applied to ceramic and glass products.

The said polymer or polymer composition can be utilized as a resin hard coating agent by adding a synthetic resin.

Further, an incorporation of an inorganic filler into the said polymer or polymer composition provides an inorganic adhesive with high heat resistance. Application thereof on a glass cloth can offer a heat-resistant cloth.

Still further, a conductivity is afforded to the product by adding a conductive material, and the product can be used as a hygienic material by adding an inorganic or organic antibacterial or mildewproofing agent. It is also very easy to incorporate a colorant or a fluorescent agent in the said polymer or polymer composition.

BEST MODE FOR CARRYING OUT THE INVENTION

Detailed Description

When the component (a) (a silane compound containing amino group) and the component (b) (a boron compound) are mixed with each other, they are reacted to form a limpid and viscous liquid and the liquid is solidified in several minutes to several ten minutes. This can be accounted for as follows: the boron compound functions as a crosslinking agent through the medium of the amino group in the component (a) to cause a polymerization of these components, resulting in forming a viscous liquid and its solidification. The component (a) is liquid. In the present invention, no water is used in reacting the component (a) and the component (b).

The component (a) is a silane compound containing an amino group represented by the following formula:

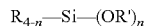

$$R_{4-n}—Si—(OR')_n$$

(wherein R represents an organic group containing an amino group; R' represents methyl, ethyl or propyl; and n is an integer selected from 1 to 3.)

Here, R represents an organic group containing an amino group, the examples thereof including, though not limited to, monoaminomethyl, diaminomethyl, triaminomethyl, monoaminoethyl, diaminoethyl, triaminoethyl, tetraminoethyl, monoaminopropyl, diaminopropyl, triaminopropyl, tetraaminopropyl, monoaminobutyl, diaminobutyl, triaminobutyl, tetraaminobutyl, and organic groups having an alkyl or aryl group with a greater number of carbon atoms than those mentioned above. Of these organic groups, γ-aminopropyl, aminoethyl and aminopropyl are especially preferred, with γ-aminopropyl being the most preferred.

R' in the formula of the component (a) represents methyl, ethyl or propyl, with methyl and ethyl being preferred.

Letter n in the formula of the component (a) is an integer selected from 1 to 3. n is preferably 2 or 3, especially preferably 3.

Thus, γ-aminopropyltriethoxysilane and N-β-(aminoethyl)-γ-aminopropyltrimethoxysilane are particularly preferred as the component (a).

The component (b) is at least one boron compound selected from the group consisting of $H_3BO_3$ and $B_2O_3$, $H_3BO_3$ being preferred.

The amounts of both components used in the reaction are adjusted so that the amount of the component (b) will be 0.02 mol or larger, preferably 0.02 to 8 mol, more preferably 0.02 to 5 mol, per mol of the component (a).

If the amount of the component (b) is less than 0.02 mol per mol of the component (a), the time required for solidification may prolong or the mixture may not be solidified sufficiently. On the other hand, if the amount of the component (b) exceeds 8 mol, the component (b) may remain undissolved in the component (a).

The mixing conditions (temperature, mixing time, mixing method, etc.) of the components (a) and (b) of the polymer of the present invention can be properly selected. Under ordinary conditions of room temperature, the mixture becomes a limpid and viscous liquid and is solidified in several minutes to several ten minutes. The time required for the solidification and the viscosity and rigidity of the obtained reaction product differ also depending on the ratio of the boron compound used in the reaction.

The boron compound (b) is preferably offered as an alcohol solution of a boron compound prepared by dissolving the boron compound in an alcohol with a carbon number of 1 to 7. Examples of the alcohols with a carbon number of 1 to 7 include methyl alcohol, ethyl alcohol, various kinds of propyl alcohol, various kinds of butyl alcohol and glycerin, of which methyl alcohol, ethyl alcohol and isopropyl alcohol are preferred. Use of such an alcohol solution can shorten the time required for dissolving the component (b) in the component (a). The higher the concentration of the boron compound in the alcohol, the more preferable for handling of the solution.

The said reaction product is preferably a reaction product obtained by reacting the component (a) with the component (b) without going through a step of hydrolysis using water.

The polymer composition according to the present invention can comprise the said polymer comprising a reaction product of the component (a) and the component (b), and a metal alkoxide (component (c)). That is, the metal alkoxide (component (c)) can be added in the course of or after the reaction of the components (a) and (b). By the incorporation of the component (c), it is possible to increase the content of the metal salt in the reaction product to improve its electrical and chemical properties. Also, since the product assumes a viscous liquid state same as when no component (c) is used, the product can be worked into fibers or films.

Examples of the metal in the metal alkoxide of the component (c) include, though not limited to, Si, Ta, Nb, Ti, Zr, Al, Ge, B, Na, Ga, Ce, V, Ta, P and Sb. Si, Ti and Zr are preferred, with Si and Ti being especially preferred as the component (c) is preferably liquid. Exemplary of the alkoxide (alkoxyl group) in the metal alkoxide of the component (c) are methoxy, ethoxy, propoxy, butoxy and other alkoxyl groups having a greater number of carbon atoms than those mentioned above. Of these alkoxyl groups, methoxy, ethoxy, propoxy and butoxy are preferred, with methoxy and ethoxy being especially preferred. Tetramethoxysilane and tetraethoxysilane can be cited as the particularly preferred examples of the component (c).

The amount of the component (c) used is preferably 10 mol or less, more preferably 0.1 to 5 mol, per mol of the component (a). If the component (c) is less than 0.1 mol per mol of the component (a), it may become hard to obtain the effect of the addition of the component (c) as mentioned above. If the component (c) exceeds 5 mol, the product may become cloudy.

The polymer composition of the present invention can contain a silicone oil (component (d)) in place of or in addition to the component (c). That is, the silicone oil (component (d)) can be added in place of or in addition to the component (c) during or after the reaction of the components (a) and (b). Addition of the component (d) can provide flexibility to the reaction product and can also afford a stiffness to the silicone.

The silicone oil of the component (d) is a polymer having siloxane bonds. Examples of such a polymer can be methylpolysiloxane, methyl phenyl silicone and amine-, epoxy- or phenol-modified silicones having a variety of polymerization degree (molecular weight). Dimethylpolysiloxane (dimethyl silicone) is preferred.

The amount of the component (d) used is preferably 10 mol or less, more preferably 0.1 to 5 mol, in terms of siloxane recurring units of the component (d), per mol of the component (a). If the component (d) is less than 0.1 mol, it can become hard to obtain the due effect of addition of the component (d) as mentioned above, and if the component (d) exceeds 5 mol, the reaction product of the components (a) and (b) can be unable to exhibit its anticipated function due to the reaction product of the component (a) and the component (b).

The polymer composition of the present invention can further contain a synthetic resin (component (e)) in place of or in addition to the component (c) and/or the component (d). That is, the synthetic resin (component (e)) can be added in place of or in addition to the component (c) and/or the component (d) during or after the reaction of the components (a) and (b). Addition of the component (e) provides a crack resistance to the obtained reaction product and enables use of the polymer composition for resin hard coating agent.

The synthetic resins usable as the component (e) are not specifically defined in the present invention; it is possible to use the synthetic resin ranging widely in polymerization degree (molecular weight), which include, for example, acrylic resins, epoxy resins, polyester resins, amino resins, urethane resins and furan resins. Of these synthetic resins, vinyl ester resins, epoxy acrylate, dipentaerythritol hexaacrylate and the like are preferred.

The amount of the component (e) used is preferably 50% by weight or less, more preferably 1 to 40% by weight, based on the overall amount of the composition. If the component (e) is less than 1% by weight, it can become hard to obtain the effect of addition of the component (e) as mentioned above. If the component (e) exceeds 40% by weight, it can become necessary to add a resin curing agent, and there can not be obtained a high hardness.

The polymer composition of the present invention can also contain an inorganic powder and/or carbon powder (component (f)) in place of or in addition to the component (c), the component (d) and/or the component (e) mentioned above. That is, the inorganic powder and/or carbon powder (component (f)) can be added in place of or in addition to the said components (c), (d) and/or (e) during or after the reaction of the components (a) and (b). By adding the component (f), it is possible to provide a heat resistance and a heat conductivity to the reaction product, and the polymer composition containing this component (f) can be used as an inorganic adhesive or coating agent.

The inorganic powder and/or carbon powder usable as the component (f) are not specifically defined in the present invention, but various kinds of metal oxides such as alumina powder and glass powder, silicon oxide, titanium oxide, zirconium oxide, boron nitride, aluminum nitride, silicon nitride, silicon carbide and the like can be cited as examples of the component (f).

Conductive materials, for example, metals such as Au, Ag, Ni and Cu and their oxides, various metal salts such as CuCl, $CuCl_2$, AgCl, $SnCl_2$, $ZnCl_2$, $YCl_3$, $AgNO_3$ and $CuSO_4$, and carbon are also usable as the component (f). Incorporation of such a conductive material as the component (f) affords a conductivity to the obtained reaction product, and the polymer composition containing this component (f) can be used as a conductive adhesive or conductive coating agent.

The amount of the component (f) used is preferably 500 parts by weight or less, more preferably 0.5 to 300 parts by weight, per 100 parts by weight of the polymer. If the component (f) is less than 0.5 part by weight, it can become hard to obtain the effect of addition of the component (f). If the component (f) exceeds 500 parts by weight, a sufficient adhesiveness can not be obtained.

Functional materials can be obtained by coating the inorganic or organic base materials with the polymer or polymer composition comprising the reaction product of the present invention. A variety of materials such as wood, stone, plastic and textile goods can be used as the inorganic or organic base materials. By thus coating the inorganic or organic base materials with the polymer or polymer composition of the present invention, it is possible to produce an antistatic effect, an oxygen and water vapor barrier effect and a blemish sealing effect. Particularly, by applying the polymer or polymer composition comprising the reaction product of the present invention on a cloth such as glass cloth while it is still in a state of liquid or syrup, there can be easily obtained a filled-up cloth or heat-resistant cloth. The polymer and/or polymer composition of the present invention can be applied to coating even if its viscosity is 1 poise or less, so that by having the polymer and/or the polymer composition impregnated in a base material, it is possible to modify the quality of the base material while keeping its intrinsic properties intact.

Further, a binder made by containing a photocatalyst in the polymer or polymer composition of the present invention is less liable to decompose with time than ordinary organic binders. Also, by coating a base material with the polymer or polymer composition of the present invention, the surface of the base material is provided with heat resistance and electrical insulation.

Moreover, by adding an inorganic powder such as alumina, silica or glass powder, it is possible to obtain an high-grade inorganic adhesive which is applicable even under high temperatures exceeding 1,000° C. and shows high adhesive force even at normal temperature. Similarly, by adding a metal powder or metal ion, there can be obtained a conductive coating or conductive adhesive. When it is desired to color the preparation, a metal ion, organic colorant or organic fluorescent agent can be added. This can greatly lessen a discoloration of the organic fluorescent agents. Also, an inorganic or organic antibacterial agent or mildewproofing agent can be added for utilizing the preparation as a sanitary material.

By forming into fibers the polymer or polymer composition comprising the reaction product of the present invention, it is possible to obtain a nonwoven fabric with an excellent heat resistance and chemical resistance. Methods such as melt spinning, centrifugation and electrospinning can be employed for forming fibers. Preferably the polymer composition containing the component (c) is formed into fibers.

By granulating the polymer and/or polymer composition comprising the reaction product of the present invention, it can be utilized as an inorganic filler. Granulation can be effected by, for instance, a method in which the polymer or polymer composition is made into a spherical form and solidified by spraying or a method in which a thin film is formed by spin coating and is crashed. Preferably the polymer composition containing the component (c) is granulated.

A glass base material obtained by calcining the functional material or the fibrous or granular polymer or polymer composition of the present invention at a temperature of 1,000° C. or below is raised in density by calcination and can be utilized as an inorganic filler.

Further, by coating a base material such as a glass fiber cloth with a polymer comprising the reaction product of the present invention and then calcining it at a temperature of 1,000° C. or below, it is possible to obtain a glass base material having an inorganic coating film.

Since the polymer and/or polymer composition of the present invention has its skeleton composed of an inorganic material (Si), it can also be used as a photocatalytic adhesive which is less prone to decomposition or degradation than the organic adhesives (of the carbon skeleton).

EXAMPLES

The present invention will be explained by showing the embodiments thereof.

The test samples were prepared by mixing the components in the molar ratios shown in Tables 1 to 3 for the respective Examples, but in the cases where one of the components (c) to (e) was used in addition to the components (a) and (b), tetraethoxysilane (TEOS) (component (c)), silicone oil (dimethyl silicone) (component (d)) and/or the component (e) were added after reacting a silane compound containing an amino group (component (a)) sufficiently with a boron compound (component (b)), and the time taken for the reaction product to solidify at normal temperature was measured.

It was found that the greater the amount of the boron compound added, the higher the viscosity of the preparation before solidification, and when the amount of the boron compound is small, the viscosity becomes lower correspondingly, making it hard to carry out molding.

Example 1

To 221 g (1 mol) of a γ-aminopropyltriethoxysilane solution was added 1.24 g (0.02 mol) of $H_3BO_3$ powder, and the mixture was stirred for 5 minutes and then allowed to stand to prepare a test sample.

Example 2

A test sample was prepared in the same way as in Example 1 except for use of a boron compound (component (b)) in an amount of 12.4 g (0.2 mol).

Example 3

To 221 g (1 mol) of a γ-aminopropyltriethoxysialne solution was added 24.7 g (0.4 mol) of $H_3BO_3$ powder, and after 5-minute stirring, tetraethoxysilane was added as the component (c) in an amount of 208 g (1.0 mol), the mixture being further stirred for 5 minutes and then allowed to stand to prepare a test sample.

Example 4

A test sample was prepared in the same way as in Example 3 except for use of 30.9 g (0.5 mol) of a boron compound (component (b)).

Example 5

To 221 g (1 mol) of a γ-aminopropyletriethoxysilane solution was added 61.8 g (1.0 mol) of $H_3BO_3$ powder, and after 5-minute stirring, 416 g (2.0 mol) of tetraethoxysilane and 162 g (1.0 mol) of dimethylpolysilane were added as the component (c), the mixture being further stirred for 5 minutes and then allowed to stand to prepare a test sample.

Example 6

A test sample was prepared in the same way as in Example 3 except that 162 g (1.0 mol) of dimethylpolysiloxane was used as the component (d) in place of tetraethoxysilane used as the component (c).

Example 7

A test sample was prepared in the same way as in Example 1 except that 190 g (1 mol) of N-β-(aminoethyl)-γ-aminopropyltrimethoxysilane was used as the component (a) and the boron compound (component (b)) was used in an amount of 30.9 g (0.5 mol).

Example 8

A test sample was prepared in the same way as in Example 3 except that the boron compound (component (b)) was used in an amount of 309 g (5.0 mol), and tetraethoxysilane of the component (c) was used in an amount of 416 g (2.0 mol).

Example 9

A test sample was prepared in the same way as in Example 8 except that the boron compound (component (b)) was used in an amount of 618 g (10.0 mol).

Comparative Example 1

To 416 g (2.0 mol) of tetraethoxysilane was added 61.8 g (1.0 mol) of $H_3BO_3$, and the mixture was stirred for 5 minutes and then allowed to stand to prepare a test sample.

Comparative Example 2

To 208 g (1.0 mol) of tetraethoxysilane was added 221 g (1.0 mol) of a γ-aminopropyltriethoxysilane solution, and the mixture was stirred for 5 minutes and then allowed to stand to prepare a test sample.

Evaluation Methods

<Solidification Time>

5 ml of each test sample was put into a 20 ml beaker, and the time taken for the sample to come to assume a state in which it was immobile even when the beaker was turned upside down was measured and represented as the solidification time.

<Rigidity>

Each test sample was coated on a mild steel plate and heated at 120° C. for one hour, and the hardness of the coat was shown by pencil hardness (according to JIS K540 08.4, 2).

The polymer compositions of Examples 3 to 5, 8 and 9, which contained the component (c), showed no change in visual appearance even after having been kept immersed in 1N sulfuric acid at 70° C. for 4 hours. The polymer compositions of Examples 5 and 6, which contained the component (d) in addition to or in place of the component (c), were capable of forming the larger moldings (thin plates) than possible with the compositions containing no component (d) and showed greater flexibility than the latter compositions.

In the case of the polymer compositions in which 1 mol of trimethyl borate (($CH_3O)_3B$) obtained by dissolving boric acid in methyl alcohol was added as the boron compound of the component (b) and 1 mol of a γ-aminopropyltriethoxysilane solution was added as the component (a) and 1.0 mol of tetraethoxysilane was added as the component (c), the solidification time was one hour and the rigidity of the compositions after solidification was 9H or higher.

TABLE 1

|  | Example 1 | Example 2 | Example 3 | Example 4 | Example 5 | Example 6 |
|---|---|---|---|---|---|---|
| (b) component Boron compound: $H_3BO_3$ | 0.02 mol | 0.2 mol | 0.4 mol | 0.5 mol | 1.0 mol | 0.5 mol |
| (a) component Silane compound containing amino group: $(C_2H_5O)_3SiC_3H_6NH_2$*[1] | 1.0 mol | 1.0 mol | 1.0 mol | 1.0 mol | 1.0 mol | 1.0 mol |

TABLE 1-continued

|  |  |  |  |  |  |  |
|---|---|---|---|---|---|---|
| (a) component Silane compound containing amino group: $(CH_3O)_3SiC_3H_6NHC_2H_5NH_2$ *2) | — | — | — | — | — | — |
| (c) component TEOS: $Si(OC_2H_5)_4$ | — | — | 1.0 mol | 1.0 mol | 2.0 mol | — |
| (d) component Dimethyl silicone | — | — | — | — | 1.0 mol | 1.0 mol |
| Solidification time (min) | 60 | 30 | 15 | 30 | 40 | 30 |
| Rigidity*3) | 4H | 6H | ≧9H | ≧9H | ≧9H | 8H |

|  | Example 7 | Example 8 | Example 9 | Comparative Example 1 | Comparative Example 2 |
|---|---|---|---|---|---|
| (b) component Boron compound: $H_3BO_3$ | 0.5 mol | 5.0 mol | 10.0 mol | 1.0 mol |  |
| (a) component Silane compound containing amino group: $(C_2H_5O)_3SiC_3H_6NH_2$ *1) | — | 1.0 mol | 1.0 mol |  | 1.0 mol |
| (a) component Silane compound containing amino group: $(CH_3O)_3SiC_3H_6NHC_2H_5NH_2$ *2) | 1.0 mol | — | — |  |  |
| (c) component TEOS: $Si(OC_2H_5)_4$ |  | 2.0 mol | 2.0 mol | 2.0 mol | 1.0 mol |
| (d) component Dimethyl silicone | — | — | — |  |  |
| Solidification time (min) | 60 | 30 | 30 Boric acid remained | Unsolidified | Unsolidified |
| Rigidity*3) | 4H | ≧9H | ≧9H | — | — |

*1) γ-aminopropyltriethoxysilane
*2) N-β-(aminoethyl)-γ-aminopropyltrimethoxysilane
*3) Rigidity (pencil hardness) of the polymers after solidified Examples 10 to 15

To 221 g (1.0 mol) of a γ-aminopropyltriethoxysilane solution was added 61.8 g (1.0 mol) of $H_3BO_3$ powder, and after 5-minute stirring, 832 g (4.0 mol) of tetraethoxysilane (TEOS) was further added to prepare a test sample for hard coating. To the thus prepared solution was added a vinyl ester resin (available from Showa Polymer Co., Ltd. under the trade name of R800) (Examples 10-12) or dipentaerythritol hexaacrylate (produced by Daicel Chemical Industries Co., Ltd.) (Examples 13-15) in an amount of 10% by weight (Examples 10 and 13), 20% by weight (Examples 11 and 14) or 30% by weight (Examples 12 and 15) based on the overall amount of the preparation. The mixtures were stirred and hardened, and the pencil hardness of the products were measured.

Comparative Examples 3 and 4

In Comparative Example 3, benzoyl peroxide (BPO) (curing agent) was mixed in an amount of 1 part by weight to 100 parts by weight of the vinyl ester resin (R800 produced by Showa Polymer Co., Ltd.), and the mixture was cured at 110° C. for one hour.

In Comparative Example 4, Irgacure 184 (a curing agent produced by Ciba Specialty Chemicals Co., Ltd.) was mixed in an amount of 3 parts by weight to 100 parts by weight of dipentaerythritol hexaacrylate, the mixture was cured by irradiation with ultraviolet light, and the pencil hardness of the product was measured.

As seen from Table 2, each of the resins incorporated with the component (e) was improved in rigidity (pencil hardness) in comparison with the resins (Comparative Examples 3 and 4) using a curing agent alone.

TABLE 2

|  | Example 10 | Example 11 | Example 12 | Example 13 | Example 14 | Example 15 | Comparative Example 3 | Comparative Example 4 |
|---|---|---|---|---|---|---|---|---|
| (b) component Boron compound: $H_3BO_3$ | 1.0 mol | 1.0 mol | 1.0 mol | 1.0 mol | 1.0 mol | 1.0 mol | — | — |

TABLE 2-continued

|  | Example 10 | Example 11 | Example 12 | Example 13 | Example 14 | Example 15 | Comparative Example 3 | Comparative Example 4 |
|---|---|---|---|---|---|---|---|---|
| (a) component Silane compound containing amino group: $(C_2H_5O)_3SiC_3H_6NH_2$ | 1.0 mol | 1.0 mol | 1.0 mol | 1.0 mol | 1.0 mol | 1.0 mol | — | — |
| (c) component TEOS: $Si(OC_2H_5)_4$ | 4.0 mol | 4.0 mol | 4.0 mol | 4.0 mol | 4.0 mol | 4.0 mol | — | — |
| (e) component Vinyl ester resin R800 | Added 10% | Added 20% | Added 30% | — | — | — | (e) component alone | — |
| (e) component Dipentaerythritol hexaacrylate | — | — | — | Added 10% | Added 20% | Added 30% | — | (e) component alone |
| Rigidity (pencil hardness) | ≧9H | ≧9H | 8H | ≧9H | ≧9H | 6H | 6H | 4H |

To 221 g (1.0 mol) of a γ-aminopropyltriethoxysilane solution was added 61.8 g (1.0 mol) of $H_3BO_3$ powder, and after 5-minute stirring, 832 g (4.0 mol) of tetraethoxysilane (TEOS) was further added to obtain a test sample for hard coating. This sample for hard coating was applicable as an adhesive, and when alumina powder was mixed in an amount of 100 parts by weight to 30 parts by weight of this sample, there was obtained an inorganic adhesive which would not crack under high temperatures and could stand use at a temperature of up to 1,500° C. Further, this hard coating sample could be provided with a conductivity by adding a conductive material, and also an incorporation of the additive materials such as antibacterial agent, mildewproofing agent, colorant and fluorescent agent in the sample was very easy.

When this hard coating sample was applied on a glass cloth and calcined at 600° C., a heat-resistant glass cloth with a uniform coating could be obtained.

Examples 16 and 17 and Comparative Examples 5 and 6

The samples were prepared and tested in the same way as described above except that the components used were changed as shown in Table 3.

TABLE 3

|  | Comparative Example 5 | Comparative Example 6 | Example 16 | Example 17 |
|---|---|---|---|---|
| (b) component Boron compound: $H_3BO_3$ | — | 0.01 mol | 0.2 mol | 0.2 mol |
| (a) component Silane compound containing amino group: $(C_2H_5O)_3SiC_3H_6NH_2$ | 1.0 mol | 1.0 mol | 1.0 mol | 1.0 mol |
| (c) component TEOS: $Si(OC_2H_5)_4$ | — | — | 0.1 mol | 5.0 mol |
| Solidification time (min) | Unsolidified | Unsolidified | 50 | 120 |
| Rigidity (pencil hardness) | — | — | 8H | ≧9H |

INDUSTRIAL APPLICABILITY

By applying the polymer or polymer composition of the present invention on an inorganic or organic base material, it is possible to obtain a functional material with heat resistance or electrical insulation provided on the base material surface. Also, by applying the said polymer or polymer composition on a cloth, there can be obtained a filled-up cloth. Also, this polymer or polymer composition, with a photocatalyst contained, can be used as a binder. Further, by forming the polymer composition of this invention into fibers, it is possible to obtain a nonwoven fabric with excellent heat and chemical resistance. The composition, when granulated, can be utilized as an inorganic filler. The glass base materials provided according to the present invention can be used as an inorganic filler.

The invention claimed is:

1. A polymer composition comprising a reaction product obtained by reacting (a) a silane compound containing an amino group represented by the following formula:

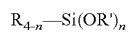

(wherein R represents an organic group containing an amino group; R' represents methyl, ethyl or propyl; and n is an integer selected from 1 to 3) with (b) at least one boron compound selected from the group consisting of $H_3BO_3$ and $B_2O_3$, wherein the components (a) and (b) are reacted in a molar ratio of component (b) to component (a) of 0.02 or larger, wherein the reaction product obtained by reacting components (a) and (b) is not prepared using a sol-gel method, and wherein the polymer composition further comprises (c) a metal oxide.

2. A polymer composition according to claim 1, wherein the boron compound (b) is an alcohol solution of a boron compound prepared by dissolving the boron compound in an alcohol with a carbon number of 1 to 7.

3. A polymer composition according to claim 1, wherein the silane compound containing an amino group of the component (a) is γ-aminopropyltriethoxysilane, and the boron compound of the component (b) is $H_3BO_3$.

4. A polymer composition according to claim 1, wherein the amount of the component (b) used in the reaction is 0.02 to 5 mol per mol of the component (a).

5. A polymer composition according to claim 1, wherein the reaction product is obtained by reacting the component (a) with the component (b) without going through a step of hydrolysis in which water is added.

6. A polymer composition according to claim 1, wherein the metal in the component (c) is at least one element selected from the group consisting of Si, Ti and Zr.

7. A polymer composition according to claim 6, wherein, as the metal alkoxide of the component (c), tetramethoxysilane and/or tetraethoxysilane is present in an amount of 10 mol or less per mol of the component (a).

8. A polymer composition according to claim 1, further containing (f) an inorganic powder and/or carbon powder.

9. A polymer composition according to claim 1, further comprising (d) a silicone oil.

10. A polymer composition according to claim 1, further comprising (e) a synthetic resin.

11. A functional material obtained by coating an inorganic or organic base material with the polymer composition set forth in any one of claims 1 to 5.

12. A functional material obtained by coating an inorganic or organic base material with the polymer composition set forth in any one of claims 1, 9, 10 and 8.

* * * * *